US012062267B1

(12) United States Patent
Williamson

(10) Patent No.: US 12,062,267 B1
(45) Date of Patent: Aug. 13, 2024

(54) CREDIT CARD WITH LOCATION TRACKING DEVICE

(71) Applicant: UIPCO, LCC, San Antonio, TX (US)

(72) Inventor: Nicole Williamson, Grand Prairie, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/474,447

(22) Filed: Sep. 26, 2023

Related U.S. Application Data

(63) Continuation of application No. 18/068,851, filed on Dec. 20, 2022, now Pat. No. 11,837,058.

(60) Provisional application No. 63/292,651, filed on Dec. 22, 2021.

(51) Int. Cl.
*G07F 19/00* (2006.01)

(52) U.S. Cl.
CPC .......... *G07F 19/208* (2013.01); *G07F 19/205* (2013.01)

(58) Field of Classification Search
CPC ............................ G07F 19/208; G07F 19/205
USPC ......................................................... 235/380
See application file for complete search history.

(56) References Cited

U.S. PATENT DOCUMENTS

| | | | | |
|---|---|---|---|---|
| 11,837,058 | B1 * | 12/2023 | Williamson | G07F 19/205 |
| 2008/0300785 | A1 | 12/2008 | Hsieh et al. | |
| 2009/0159703 | A1 | 6/2009 | Mullen et al. | |
| 2012/0309451 | A1 | 12/2012 | Benkelberg et al. | |
| 2015/0206416 | A1 | 7/2015 | Marra et al. | |
| 2016/0240075 | A1 | 8/2016 | Eisenman | |
| 2021/0248856 | A1 | 8/2021 | Mehrhoff et al. | |
| 2022/0179940 | A1 | 6/2022 | Stanford | |

OTHER PUBLICATIONS

Non-Final Office Action mailed Apr. 21, 2023 in U.S. Appl. No. 18/068,851.

* cited by examiner

*Primary Examiner* — Daniel A Hess
(74) *Attorney, Agent, or Firm* — Plumsea Law Group, LLC

(57) ABSTRACT

A card with an embedded location tracker that can assist with locating a misplaced, lost, or stolen card is described. The location tracking device is embedded into the material forming the card. Other devices can form a crowdsourced network covering a wide geographic area that may be used to detect signals from the location tracking device of the card using a short-range wireless communication technology. When the card becomes misplaced, lost, or stolen, the card holder or the card issuer may use the embedded location tracking device to determine the current location of the card. In one embodiment, a tamper mechanism may also be provided to disable a chip of the card in response to an attempt to deactivate, destroy, or remove the embedded location tracking device from the card.

20 Claims, 12 Drawing Sheets

CREDIT CARD WITH LOCATION TRACKING DEVICE

CROSS-REFERENCE TO RELATED APPLICATIONS

This application is a continuation of and claims the benefit of U.S. patent application Ser. No. 18/068,851 filed on Dec. 20, 2022 and titled "Credit Card with Location Tracking Device", which application claims the benefit of U.S. Provisional Patent Application Ser. No. 63/292,651 filed on Dec. 22, 2021 and titled "Technology embedded in debit/credit card/identification cards, such as driver's license (such as Tile Bluetooth locator) to assist in finding lost/misplaced credit card. when requesting a credit card, it is an optional technology", the disclosure of which applications are incorporated by reference in their entirety.

TECHNICAL FIELD

This disclosure relates to credit cards, debit cards, and identity or access cards that have an embedded location tracking device to assist with finding a lost or stolen card.

BACKGROUND

Magnetic stripe and/or chip cards, such as credit cards, debit cards, and identity or access cards, are easily misplaced, lost, or stolen. Currently, when a magnetic stripe or chip card is misplaced, lost, or stolen, the card issuer must cancel or deactivate the card and quickly send a new replacement card to the card holder. This process can be inconvenient for both the card issuer and the card holder.

There exists a need in the art to provide a card with a built in location tracking device that can assist with locating a card that has been misplaced, lost, or stolen.

SUMMARY

In one aspect, a card is provided. The card includes a body, at least one of a chip or a magnetic strip portion disposed on the body, and a location tracking device embedded within the body.

In another aspect, the card includes a battery embedded within the body that is electrically connected to at least the location tracking device.

In another aspect, the battery is charged using induction charging while the card is disposed within a slot of a payment terminal or an automatic teller machine.

In another aspect, the battery is charged using induction charging while the card is in contact or close proximity with an internal battery of a user device.

In another aspect, the location tracking device communicates using a short-range wireless communication technology.

In another aspect, the location tracking device communicates using two different short-range wireless communication technologies.

In another aspect, the two different wireless communication technologies include a first wireless communication technology having a first accuracy range and a second wireless communication technology having a second accuracy range. The second accuracy range provides a location accurate to a smaller distance than the first accuracy range.

In another aspect, the card further includes a tamper mechanism that disables or deactivates the card in response to an attempt to deactivate, destroy, or remove the embedded location tracking device from the card.

In another aspect, the card includes a chip and the tamper mechanism includes a switch that interposed between the location tracking device and the chip. The switch has a first state where the switch is closed and a second state where the switch is open. The switch remains in the first state as long as the location tracking device is connected to the switch. In the second state, the chip is disabled.

In another aspect, the card includes a chip and the tamper mechanism is a closed circuit formed between the chip, the location tracking device, and a battery. When the closed circuit is interrupted, the chip is disabled.

In another aspect, at least one area of the card has a thickness that is greater than a thickness of at least one other area of the card.

In another aspect, the at least one area of the card that has the greater thickness includes the location tracking device and a battery embedded into the body of the card.

In still another aspect, a method of tracking a card is provided. The method includes providing a card having a body, at least one of a chip or a magnetic strip region disposed on the body, and a location tracking device embedded within the body. The method also includes receiving location information associated with the location tracking device embedded in the card from at least one of a user device or a fixed-location device. The at least one of the user device or the fixed-location device communicates with the location tracking device embedded in the body of the card using a short-range wireless communication technology.

In still another aspect, a system for tracking a missing card is provided. The system includes a card having a body, at least one of a chip or a magnetic strip region disposed on the body, and a location tracking device embedded within the body. The system also includes at least one of a plurality of user devices and a plurality of fixed-location devices. The plurality of user devices and the plurality of fixed-location devices communicate with the location tracking device embedded in the card using a short-range wireless communication technology. The system also includes a server in communication with the at least one of the plurality of user devices and the plurality of fixed-location devices, the server receiving location information associated with the location tracking device embedded in the card from at least one user device or fixed-location device.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide a card with an embedded location tracker that can assist with locating a misplaced, lost, or stolen card. A magnetic stripe card, also referred to as a swipe card, is a card with a magnetic strip or magstripe attached on its surface. A chip card, also referred to as a smart card, is card with an embedded chip that can be read by a chip reader at a point-of-sale or payment terminal associated with a retailer or a bank, an automatic teller machine, or identity or access systems, such as those used in hotels and businesses. Some cards may have both a chip and a magnetic stripe. The embodiments described herein may be used in connection with various types of cards, including credit cards, debit cards, identity cards, access cards and other cards that use a chip or a magnetic strip to encode information.

Briefly, the embodiments described herein provide credit cards and other types of cards with a location tracking device that is embedded into the material forming the card. When the card becomes misplaced, lost, or stolen, the card holder and/or the card issuer may use the embedded location tracking device to determine the current location of the card. With this arrangement, a misplaced, lost, or stolen card may be recovered without the inconvenience and/or expense of having to issue a replacement card.

Figure 1:
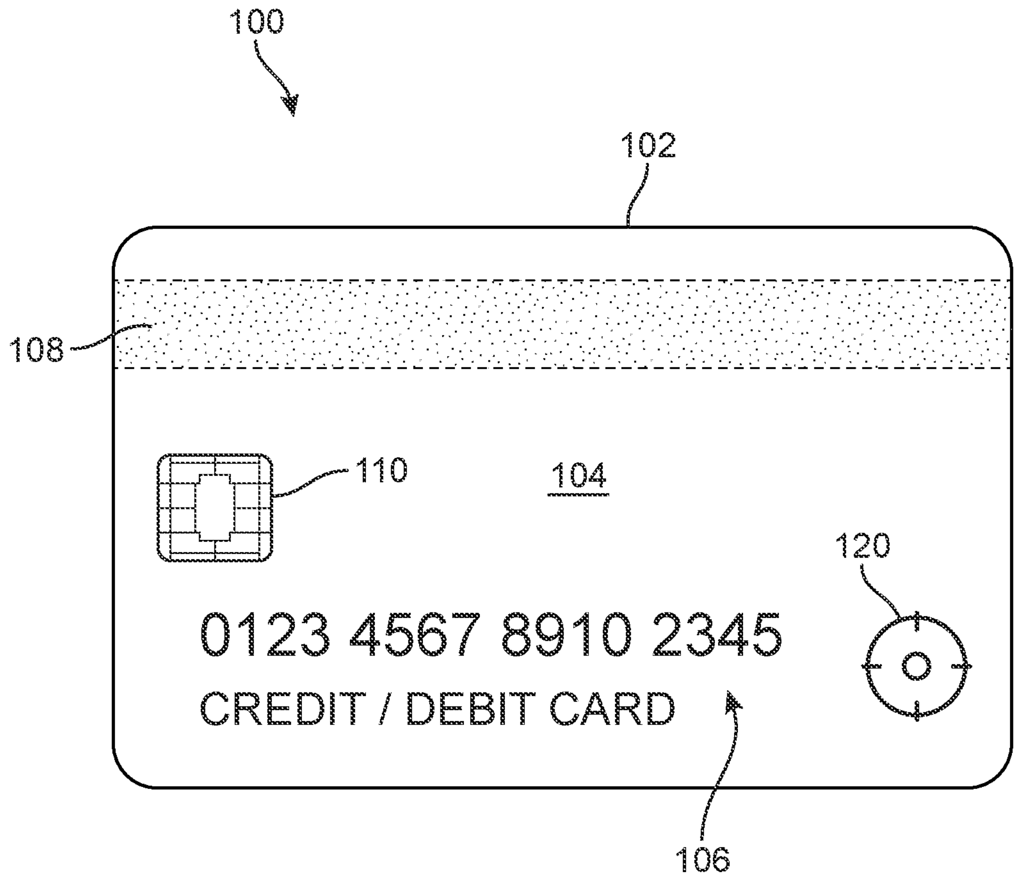
FIG. 1 is an example embodiment of a card with an embedded location tracking device.

Referring now to FIG. 1, an example embodiment of a card 100 with an embedded location tracking device 120 is shown. In this embodiment, card 100 has a body 102 having a generally rectangular shape. The length and width of body 102 of card 100 generally matches the length and width of a conventional credit or debit card. For example, credit and debit cards used in the United States and in some other countries typically have dimensions of 8.5 cm×5.4 cm. In yet some other countries, the dimensions might be different. Identity or access cards may also have different dimensions.

In some embodiments, card 100 may have a generally uniform thickness, while in other embodiments, card 100 may have different thicknesses. In an example embodiment, card 100 has a front side 104 on which card information 106 may be provided. Card information 106 may include, but is not limited to: a credit card number, expiration date, card holder name, issuing bank name, security codes, etc. In some cases, portions of card information 106 may be additionally or alternatively located on the back side of card 100 (e.g., opposite from front side 104).

In an example embodiment, card 100 includes a magnetic strip region 108. In this embodiment, magnetic strip region 108 is located on the back side of card 100 (e.g., opposite from front side 104). In other embodiments, magnetic strip region 108 may be located on front side 104 of card 100. Magnetic strip region 108 is encoded with confidential data. Magnetic strip region 108 may be any suitable type of magnetic strip, including a high-coercivity (HiCo) magnetic strip which is encoded with and can withstand the presence of a very strong magnetic field (on the order of ~4000 Oersted) or low-coercivity (LoCo) magnetic strip which is encoded with a low-intensity magnetic field (on the order of ~300 Oersted). For example, hotel room key cards and other types of identity or access cards are typically LoCo cards, whereas bank credit cards or debit cards, are typically HiCo cards.

In this embodiment, card 100 also includes a chip 110. Chip cards are designed to communicate with chip readers at automatic teller machines, point-of-sale or payment terminals, or at entry points to restricted-entry facilities using electromagnetic waves. Often, these communications are effectuated using Near-Field Communication (NFC) technology, which typically operates at 13.56 MHz. In some embodiments, chip 110 may include an integrated antenna printed directly on chip 110. In other embodiments, an antenna may be embedded into body 102 of card 100.

In the example embodiments, the shape and thickness of body 102 of card 100 are sized and dimensioned so that card 100 is able to slide into a conventional card reader, such as a magnetic stripe card reader or a chip card reader. Likewise, magnetic strip region 108 has a thickness that is selected so that magnetic strip region 108 can slide into a conventional magnetic card stripe reader. In some embodiments, the thicknesses of magnetic strip region 108 of card 100 may match the thickness of a conventional credit card.

In an example embodiment, card 100 includes location tracking device 120. Location tracking device 120 is embedded into body 102 of card 100. For example, location tracking device 120 may be surrounded on all sides by the material forming body 102 of card 100, such as a plastic or polymer material. That is, in an example embodiment, location tracking device 120 is integral with body 102 of card 100 so that it may be not be removed without destroying card 100. In this embodiment, location tracking device 120 is located in a bottom corner of body 102 of card 100. In other embodiments, location tracking device 120 may be located on other portions of card 100. As will be described in more detail below, location tracking device 120 embedded within body 102 of card 100 allows the card issuer and/or the card holder to locate card 100 when it has been misplaced, lost, or stolen.

Figure 2:
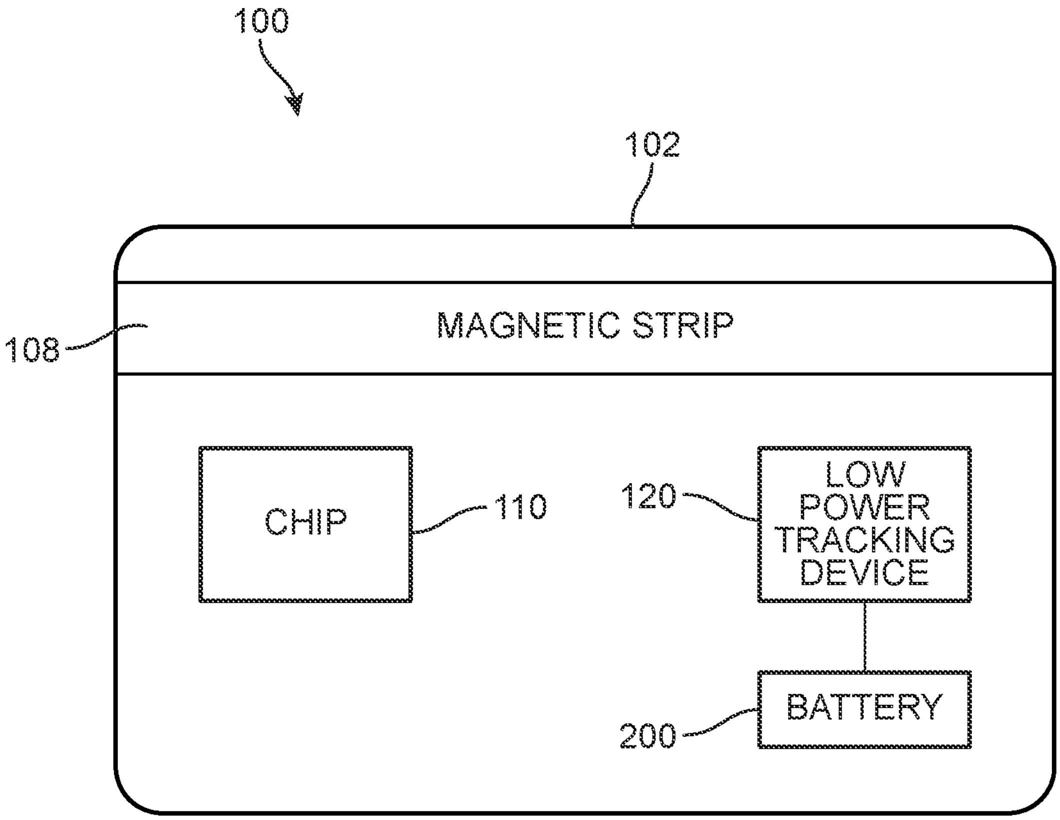
FIG. 2 is a block diagram showing an example embodiment of the components for the card with an embedded location tracking device of FIG. 1.

Referring now to FIG. 2, a block diagram showing an example embodiment of the components for card 100 with embedded location tracking device 120 is shown. In this embodiment, the components of card 100 are shown, including magnetic strip region 108, chip 110, and location tracking device 120. In an example embodiment, location tracking device 120 may be a low power tracking device that is powered by a battery 200. In one embodiment, location tracking device 120 communicates using a short-range wireless communication technology that is configured for low energy or power consumption. In some embodiments, location tracking device 120 may communicate using Bluetooth Low Energy (BLE) standard operating in the 2.4 GHz ISM band. For example, in a situation where conventional Bluetooth may use 1 Watt of power for communication, BLE uses only between 0.01 and 0.5 Watts, approximately 100 times less power. In other embodiments, location tracking device 120 may communicate using ultra-wideband (UWB) technology. In still other embodiments, location tracking device 120 may use other types of short-range wireless communication technology.

In some embodiments, location tracking device 120 may use more than one short-range wireless communication technology to communicate with other devices. Additionally, an accuracy range of each short-range wireless communication technology may be different. Location tracking device 120 may be configured to communicate with other devices using a first short-range wireless communication technology associated with a first predetermined accuracy range and a second short-range wireless communication technology associated with a second predetermined accuracy range that is more accurate (i.e., provides a location accurate to a smaller distance) than the first predetermined accuracy range. In one embodiment, card 100 with location tracking device 120 may use the first short-range wireless communication technology (e.g., BLE) with a first predetermined accuracy range of approximately 5 meters and may use the second short-range wireless communication technology (e.g., UWB) with a second predetermined accuracy range of approximately 10 centimeters. With this arrangement, location tracking device 120 may provide varying levels or degrees of location accuracy to assist the card holder and/or the card issuer locate card 100 in different environments.

In this embodiment, battery 200 is also embedded within body 102 of card 100 and is electrically connected and provides power to location tracking device 120. In one embodiment, battery 200 may be a thin-film battery. For example, the thin-film battery may be a non-rechargeable or a rechargeable lithium polymer battery. These batteries could be, for example, 0.5 mm to 1.0 mm thick and 30-40 mm×30-40 mm square, or be rectangular with an area of 800 mm square to 2,000 mm square, for example, or could be any other shape or size that provides power effective to accomplish the location tracking function of location tracking device 120. Thus battery 200 embedded in body 102 of card 100 can power location tracking device 120.

In other embodiments, location tracking device 120 may be powered or energized using electromagnetic waves broadcast or generated by other devices, such as mobile devices, point-of-sale or payment terminals, or automatic teller machines, and coupled to electrical circuits in card 100, such as a coil or a passive Radio-Frequency Identification (RFID) tag.

Figure 3:
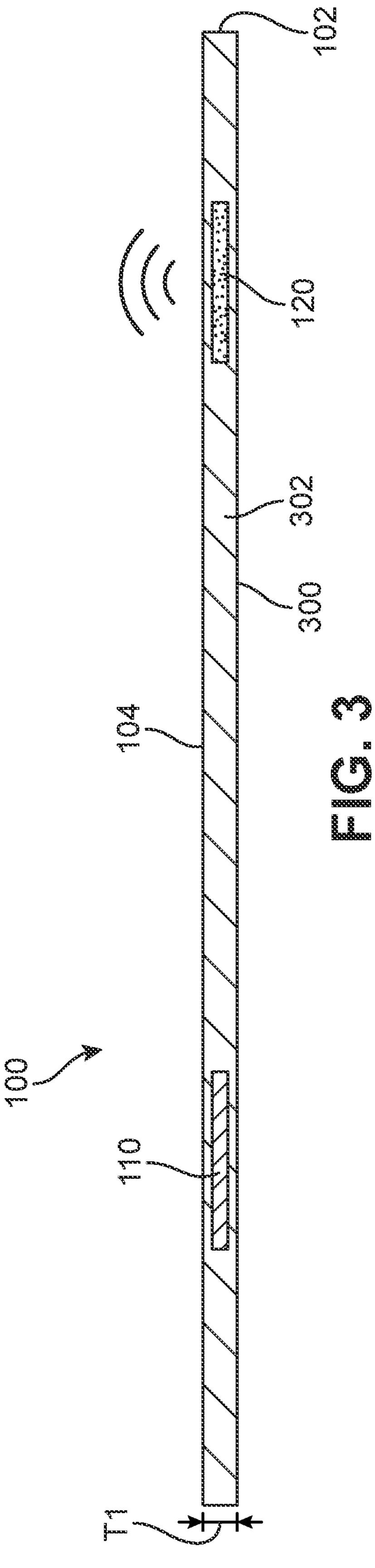
FIG. 3 is a cross-sectional view of the example embodiment of the card with an embedded location tracking device of FIG. 1.

FIG. 3 is a cross-sectional view of the example embodiment of card 100 with embedded location tracking device 120. As shown in FIG. 3, body 102 of card 100 has a thickness T1 associated with a distance between opposite sides of card 100, including front side 104 and a back side 300. In an example embodiment, thickness T1 may be approximately equal to the thickness of a conventional chip card (e.g., approximately 0.76 mm). In other embodiments, thickness T1 of card 100 may be greater than a conventional chip card (e.g., greater than 0.76 mm).

In an example embodiment, body 102 of card 100 is made of a material 302, such as a plastic or polymer material, in which chip 110 and location tracking device 120 are embedded. During manufacturing of card 100, chip 110 and location tracking device 120 may be embedded into material 302 forming body 102 of card 100. That is, rather than being added after manufacturing, location tracking device 120 is embedded directly into material 302 of card 100 as part of the process of making card 100.

In this embodiment, chip 110 and location tracking device 120 are surrounded on all sides by material 302 forming body 102 of card 100 such that chip 110 and location tracking device 120 are located between front side 104 and back side 300. In other embodiments, chip 110 and/or location tracking device 120 may be embedded within material 302 such that at least a portion of chip 110 and/or location tracking device 120 is exposed on one side of body 102 of card 100. For example, in some cases, a portion of chip 110 and/or location tracking device 120 may be exposed on front side 104 of body 102 of card 100 (i.e., one side or face of chip 110 and/or location tracking device 120 is not surrounded by material 302). In these cases, exposing a portion of chip 110 and/or location tracking device 120 on front side 104 of card 100 may improve reception of chip 110 and/or location tracking device 120 when communicating with other devices.

In some embodiments, a user, such as the card holder, may authenticate location tracking device 120 of card 100 as part of activating card 100 when it is received from the card issuer or manufacturer. The authentication of location tracking device 120 associates information or data about card 100 with information or data about the card holder, including, but not limited to: a predetermined number of digits of the card number (e.g., last four digits of the card number), an expiration date of the card, or the Card Security Value (CSV) of the card with a name of the card holder or other identifying information about the card holder.

Figure 4:
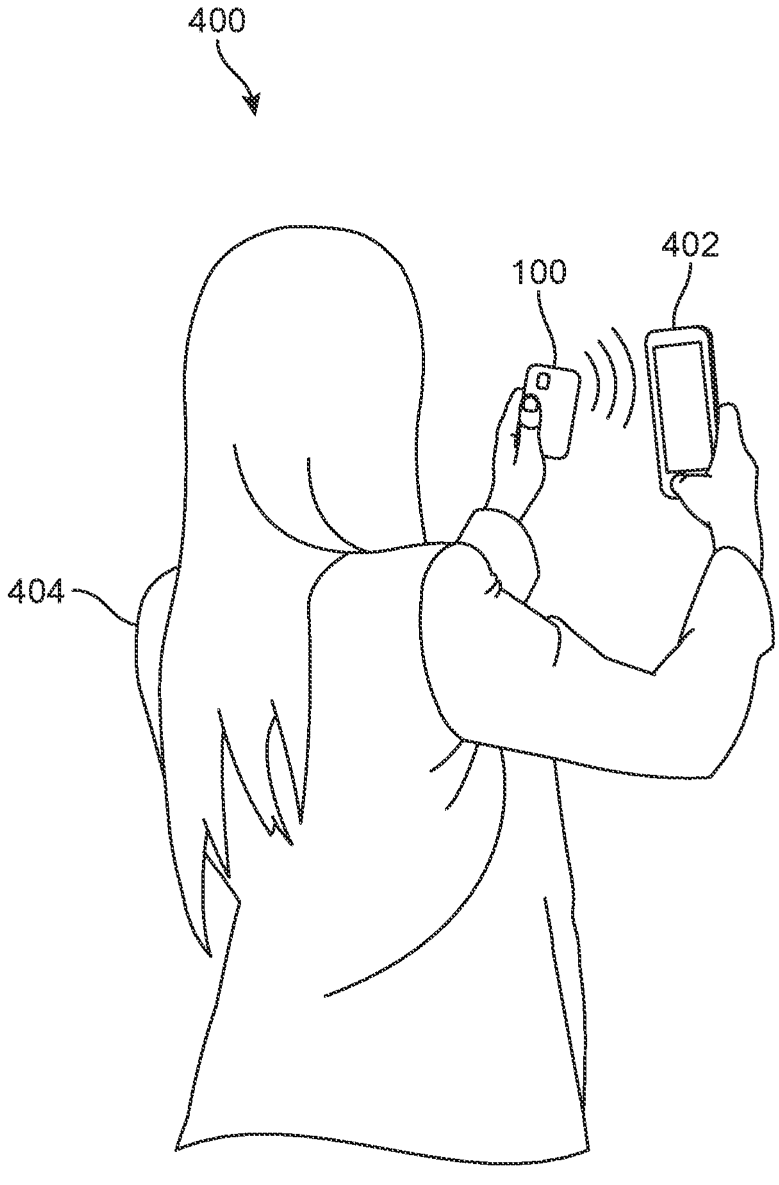
FIG. 4 is a schematic view of an example embodiment of a process of authenticating a card with an embedded location tracking device using a user device.

Referring now to FIG. 4, a schematic view of an example embodiment of a process 400 of authenticating card 100 with embedded location tracking device 120 using a user device 402 is shown. FIG. 4 is an exemplary illustration of a typical scenario of process 400 in which a user 404 is activating her card 100 with her user device 402 to authenticate location tracking device 120 of card 100. In some embodiments, user device 402 may be a smart phone, tablet, or other mobile device. Chip 110 of card 100 may include an antenna for receiving, for example, NFC electromagnetic waves broadcast by user device 402. In this example, user 404 has activated an application on her user device 402 to start process 400 by which card 100 is activated and location tracking device 120 of card 100 associates information about card 100 with information about user 404. In various embodiments, the application running on user device 402 may be an application associated with the card issuer or bank of card 100, a dedicated application used for tracking the location of card 100 using location tracking device 120, and/or an application used by user 404 to track various items or objects, including card 100.

In an example embodiment, location tracking device 120 may have a unique serial number that is preassigned or generated as part of process 400 and which is matched to the information about card 100 and/or user 404. In some embodiments, the unique serial number of location tracking device 120 may be used to contact or identify the card holder (e.g., user 404) when card 100 that has been misplaced, lost, or stolen is located by other devices. In other cases, the card issuer of card 100 may additionally or alternatively be contacted when card 100 is located.

In some embodiments, process 400 may require two-factor or multi-factor authentication to activate card 100 and to authenticate location tracking device 120 to associate it with card 100. For example, process 400 may include a step of matching biometric information from user 404 obtained using user device 402 for two-factor or multi-factor authentication, such as facial or voice recognition, retina scanning, and/or fingerprint matching. Other types of two-factor or multi-factor authentication may be used, such as a password, passphrase, personal identification number (PIN), or verification code.

According to the techniques of the present embodiments, when a card including a location tracking device (e.g., card 100 with location tracking device 120) is misplaced, lost, or stolen, the location of the card may be determined by being detected by one or more other devices. For example, the other devices can form a crowdsourced network covering a wide geographic area that may be used to detect signals from the card using the short-range wireless communication technology of the location tracking device. These other devices can include user devices of other users (i.e., different from the user whose card is missing), as well as point-of-sale or payment terminals and automatic teller machines. Other devices configured to detect or receive signals from the card using the short-range wireless communication technology of the location tracking device may also be used to determine the location of the missing card.

Figure 5:
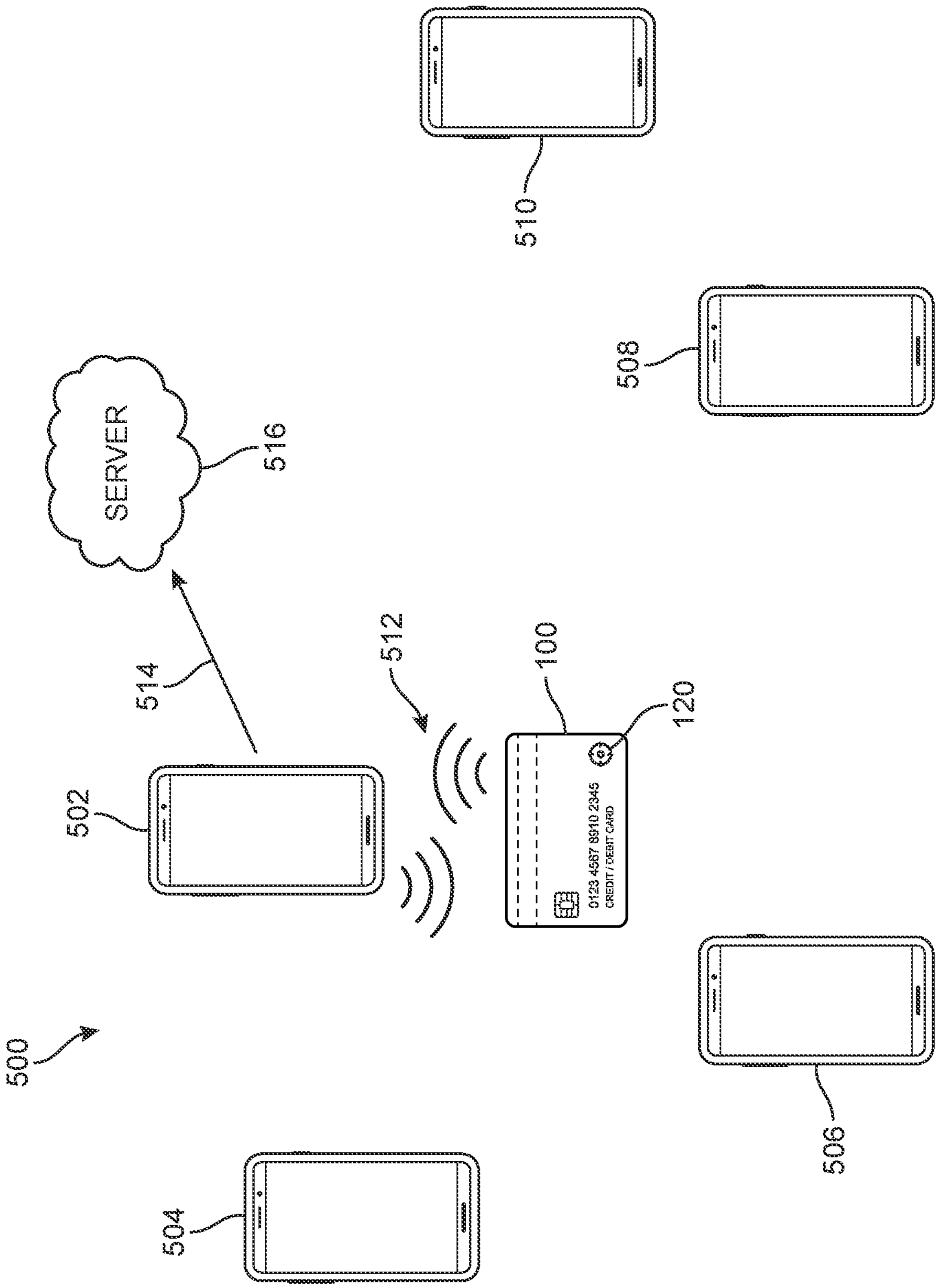
FIG. 5 is a representative view of an example scenario of using a plurality of user devices to locate a card with an embedded location tracking device.

Referring now to FIG. 5, a representative view of an example scenario 500 of using a plurality of user devices to locate card 100 with embedded location tracking device 120 is shown. In scenario 500, card 100 may be missing because it was misplaced, lost, or stolen and the card holder or the card issuer is attempting to locate missing card 100. In this embodiment, a plurality of user devices includes at least a first user device 502, a second user device 504, a third user device 506, a fourth user device 508, and a fifth user device 510. Together, the plurality of user devices may form a crowdsourced network that can sense (e.g., detect and/or receive) signals via one or more short-range wireless communication technologies, including those used by location tracking device 120 of card 100. As described above, user devices may include a smart phone, tablet, or other mobile device.

In this embodiment, as the respective users of first user device 502, second user device 504, third user device 506, fourth user device 508, and/or fifth user device 510 move about within a geographic area, the plurality of user devices may become in close proximity to missing card 100 with location tracking device 120 so as to be within a signal range of the short-range wireless communication technology used by location tracking device 120. That is, in scenario 500, first user device 502, second user device 504, third user device 506, fourth user device 508, and/or fifth user device 510 are generally mobile and moving around within the geographic area. In this manner, the plurality of user devices are able to cover a large portion of the geographic area to help the card holder or the card issuer locate missing card 100.

As shown in FIG. 5, when one of the plurality of user devices is in close proximity to missing card 100 with location tracking device 120, a signal 512 from location tracking device 120 may be detected or received by the user device, for example, first user device 502 in scenario 500. Upon detecting or receiving signal 512 from location tracking device 120 of card 100, first user device 502 may send a message 514 to a server 516 reporting that card 100 has been located. In some embodiments, message 514 from first user device 502 may include the serial number of location tracking device 120 to identify card 100, as well as other information relating to the location, date, and time that card 100 was located. For example, the location may include a GPS position determined by first user device 502 at the location where signal 512 from location tracking device 120 of card 100 was detected or received. Additionally, in cases where card 100 may be moving, message 514 may also include a heading or direction associated with the movement of card 100. Message 514 may also include additional information to assist with identifying the location of card 100 and/or the user device that detected signal 512.

In some embodiments, server 516 may be in communication with the card holder, the card issuer, or a third party that has been enlisted to find the location of card 100. For example, in some cases, card 100 with location tracking device 120 may be carried by a missing or abducted person, in which case, law enforcement officials may be in communication with server 516 to locate card 100 and thereby locate the missing or abducted person. With this arrangement, when the crowdsourced network formed by plurality of user devices 502, 504, 506, 508, 510 locates card 100 by detecting signal 512 from location tracking device 120 of card 100, the location of card 100 may be sent to server 516 via message 514 (e.g., from first user device 502 in scenario 500) and the card holder, the card issuer, or the third party may be notified.

In this embodiment, the plurality of user devices may be user devices that have elected or opted in to participate in a system for locating missing cards. For example, in some cases, the plurality of user devices may be associated with the same card issuer or bank, or may be users of the same location finding application on their respective user devices. Additionally, while scenario 500 depicts the plurality of user devices having five user devices, it should be understood that the plurality of user devices may include a large number of user devices across many geographic areas. For example, across a city, county, state, or country, the number of user devices that are able to assist with locating card 100 may be in the hundreds, thousands, tens of thousands, or more.

Figure 6:
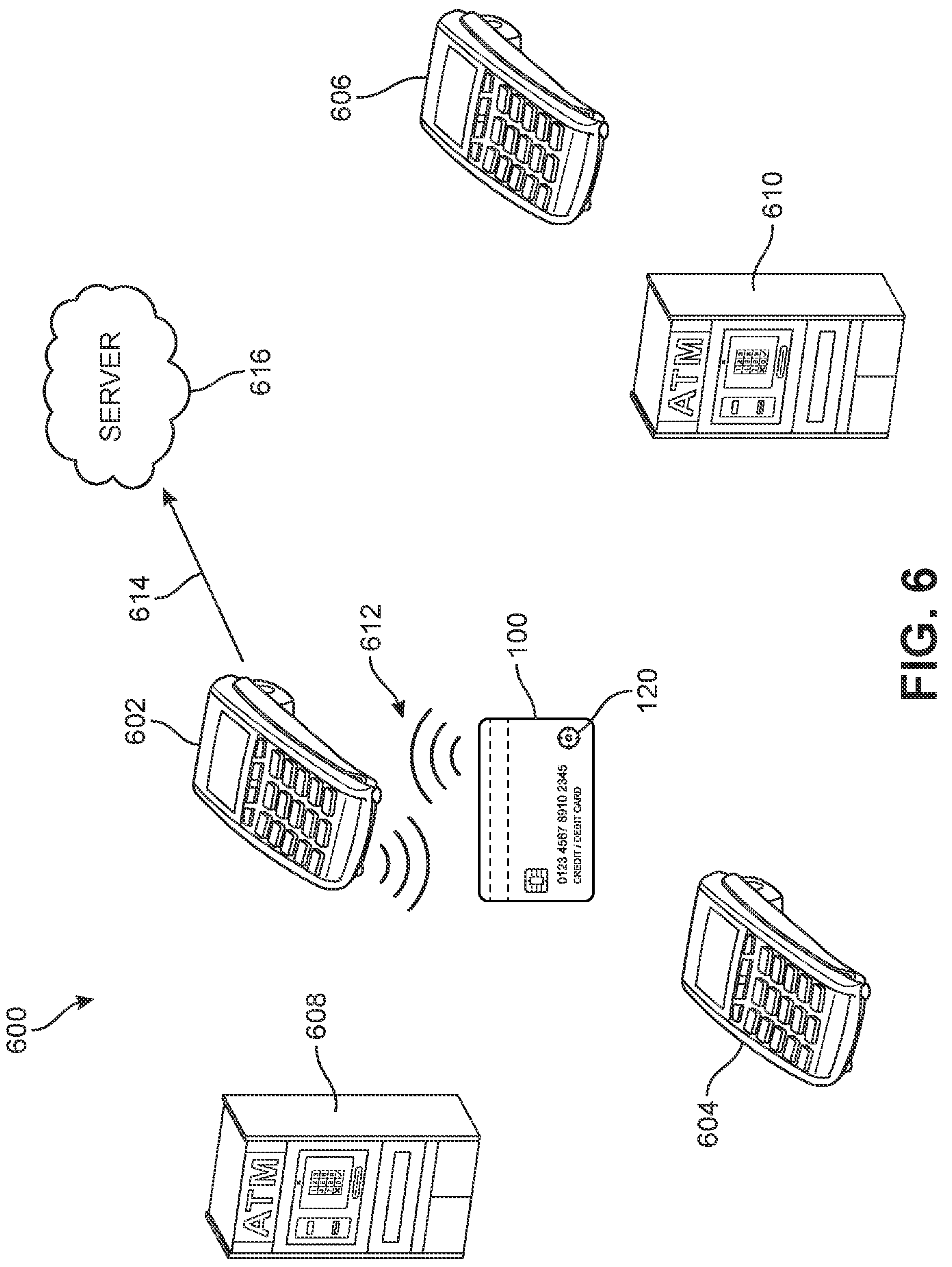
FIG. 6 is a representative view of an example scenario of using a plurality of point-of-sale terminals and/or automatic teller machines to locate a card with an embedded location tracking device.

In some embodiments, other types of devices may also form a crowdsourced network to assist with locating card 100 with location tracking device 120. Referring now to FIG. 6, a representative view of an example scenario 600 of using a plurality of fixed-location devices, such as point-of-sale terminals, payment terminals, and/or automatic teller machines, to locate card 100 with embedded location tracking device 120 is shown. In scenario 600, card 100 may be missing because it was misplaced, lost, or stolen and the card holder or the card issuer is attempting to locate missing card 100. In this embodiment, a plurality of fixed-location devices includes various types of point-of-sale or payment terminals and automatic teller machines (ATMs), including at least a first terminal 602, a second terminal 604, and a third terminal 606, as well as a first ATM 608 and a second ATM 610. Together, the plurality of fixed-location devices may form a crowdsourced network that can sense (e.g., detect and/or receive) signals via one or more short-range wireless communication technologies, including those used by location tracking device 120 of card 100. The fixed-location devices 602, 604, 606, 608, 610 may already include short-range wireless communication technology or may be retrofitted to include short-range wireless communication capabilities.

In this embodiment, one of first terminal 602, second terminal 604, third terminal 606, first ATM 608, or second ATM 610 may be in close proximity to missing card 100 with location tracking device 120 so as to be within a signal range of the short-range wireless communication technology used by location tracking device 120. That is, in scenario 600, a card holder may have left behind or dropped card 100 in a vicinity of first terminal 602, second terminal 604, third terminal 606, first ATM 608, or second ATM 610.

As shown in FIG. 6, when one of first terminal 602, second terminal 604, third terminal 606, first ATM 608, or second ATM 610 is in close proximity to missing card 100 with location tracking device 120, a signal 612 from location tracking device 120 may be detected or received by the fixed-location device, for example, first terminal 602 in scenario 600. Upon detecting or receiving signal 612 from location tracking device 120 of card 100, first terminal 602 may send a message 614 to a server 516 reporting that card 100 has been located. In some embodiments, message 614 from first terminal 602 may include the serial number of location tracking device 120 to identify card 100, as well as other information relating to the location, date, and time that card 100 was located.

In contrast to the plurality of user devices in scenario 500, the plurality of fixed-location devices in scenario 600 are generally associated with a fixed location where the point-of-sale or payment terminal or ATM is installed. These fixed-location devices may have their physical location assigned to the device so that when card 100 is located, the physical location of the fixed-location device is sent with message 614 to server 516. Message 614 may also include additional information to assist with identifying the location of card 100 and/or the fixed-location device that detected signal 612.

In some embodiments, server 516 may be in communication with the card holder, the card issuer, or a third party that has been enlisted to find the location of card 100. For example, in some cases, card 100 with location tracking device 120 may be carried by a missing or abducted person, in which case, law enforcement officials may be in communication with server 516 to locate card 100 and thereby locate the missing or abducted person. With this arrangement, when the crowdsourced network formed by plurality of fixed-location devices 602, 604, 606, 608, 610 locates card 100 by detecting signal 612 from location tracking device 120 of card 100, the location of card 100 may be sent to server 516 via message 614 (e.g., from first terminal 602 in scenario 600) and the card holder, the card issuer, or the third party may be notified.

In this embodiment, the plurality of fixed-location devices may be point-of-sale or payment terminals or ATMs that have elected or opted in to participate in a system for locating missing cards. For example, in some cases, the plurality of fixed-location devices may be associated with the same card issuer or bank, or may be part of a payment processing system or ecosystem. Additionally, while scenario 600 depicts five fixed-location devices, it should be understood that the plurality of fixed-location devices may include a large number of fixed-location devices across many geographic areas. For example, across a city, county, state, or country, the number of fixed-location devices that are able to assist with locating card 100 may be in the hundreds, thousands, tens of thousands, or more.

Additionally, in some embodiments, a crowdsourced network of devices for locating card 100 with location tracking device 120 may include both moving devices, such as plurality of user devices 502, 504, 506, 508, 510 from scenario 500, and fixed-location devices, such as plurality of fixed-location devices 602, 604, 606, 608, 610 from scenario 600. With this arrangement, the potential coverage area within a geographic area may be expanded by including devices that are mobile and those that are fixed. Together, these other devices may be used to detect missing card 100 with location tracking device 120 at a variety of places within the geographic area to assist with locating misplaced, lost, or stolen card 100.

Figure 7:
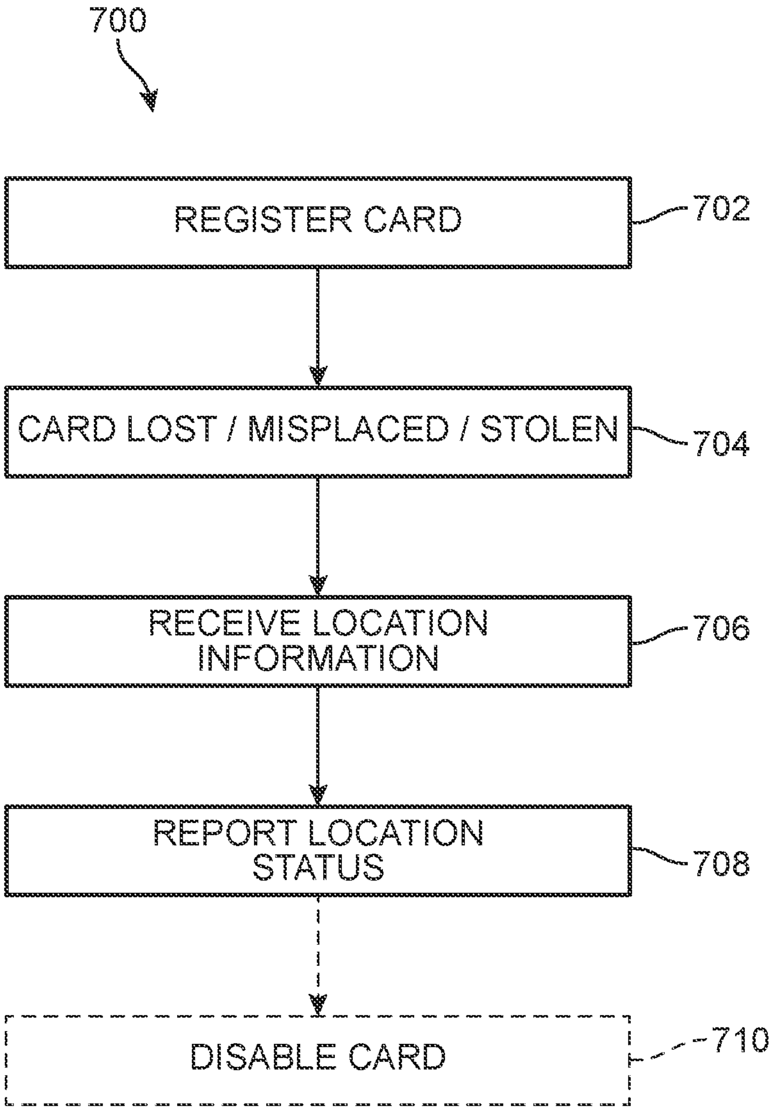
FIG. 7 is a flowchart of an example embodiment of a method of locating a card with an embedded location tracking device.

Referring now to FIG. 7, a flowchart of an example embodiment of a method 700 of locating a card with an embedded location tracking device is shown. In an example embodiment, method 700 may be used to locate card 100 with location tracking device 120. In some embodiments, card 100 with location tracking device 120 may be registered to a user or card holder at an operation 702. For example, at operation 702, a user may activate card 100 using a user device (e.g., user device 402) to authenticate location tracking device 120 and to associate it with card 100, as described in reference to process 400 of FIG. 4 above. Operation 702 may also include storing information associated with the card holder and/or the card issuer, including a name and contact information, such as an email, phone number, address.

Once card 100 is registered at operation 702, method 700 may proceed to an operation 704. At operation 704, card 100 may be reported lost, misplaced, or stolen. For example, the card holder and/or the card issuer may report card 100 lost, misplaced, or stolen at operation 704. Additionally, in some cases, a priority level for locating card 100 may be assigned based on the card's status. In an example embodiment, a priority level for a card that is misplaced or lost may be a lower priority than a priority level for a card that is stolen. The assigned priority level may change the way or urgency that the card holder or the card issuer is contacted, where a higher priority level for a stolen card causes the card holder and/or card issuer to be contacted immediately upon locating the card, whereas a lower priority level for a lost or misplaced card causes the card holder and/or card issuer to be contacted within a longer time period (e.g., within a few hours or one day).

Next, method 700 may proceed to an operation 706. At operation 706, location information for card 100 is received. In an example embodiment, operation 706 may be implemented by server 516, which is configured to receive location information about missing cards, including, card 100 with location tracking device 120. In some embodiments, the card's assigned status from operation 704 may be stored at server 516. With this arrangement, server 516 may take action upon receiving a message from a user device and/or a fixed-location device, such as message 514 and/or message 614, that identifies missing card 100 (e.g., using the assigned serial number for location tracking device 120).

At operation 708, the location status of missing card 100 is reported to the card holder, the card issuer, and/or a third-party. For example, at operation 708, the contact information associated with card 100 as part of the process of registering card 100 at operation 702 and/or as part of process 400 of activating card 100 may be used by server 516 to report the location of card 100 at operation 708. Additionally, the urgency of the reporting step at operation 708 may be based on the assigned priority level, as described in reference to operation 704 above.

Additionally, in some embodiments, method 700 may further include an optional operation 710. At operation 710, card 100 may be temporarily or permanently disabled. For example, in situations where a card is lost or misplaced, the card may be temporarily disabled (e.g., preventing its use for payment) until the card holder can pick it up from its found location. In other situations, where a card is stolen, the card may be permanently disabled.

Figure 8:
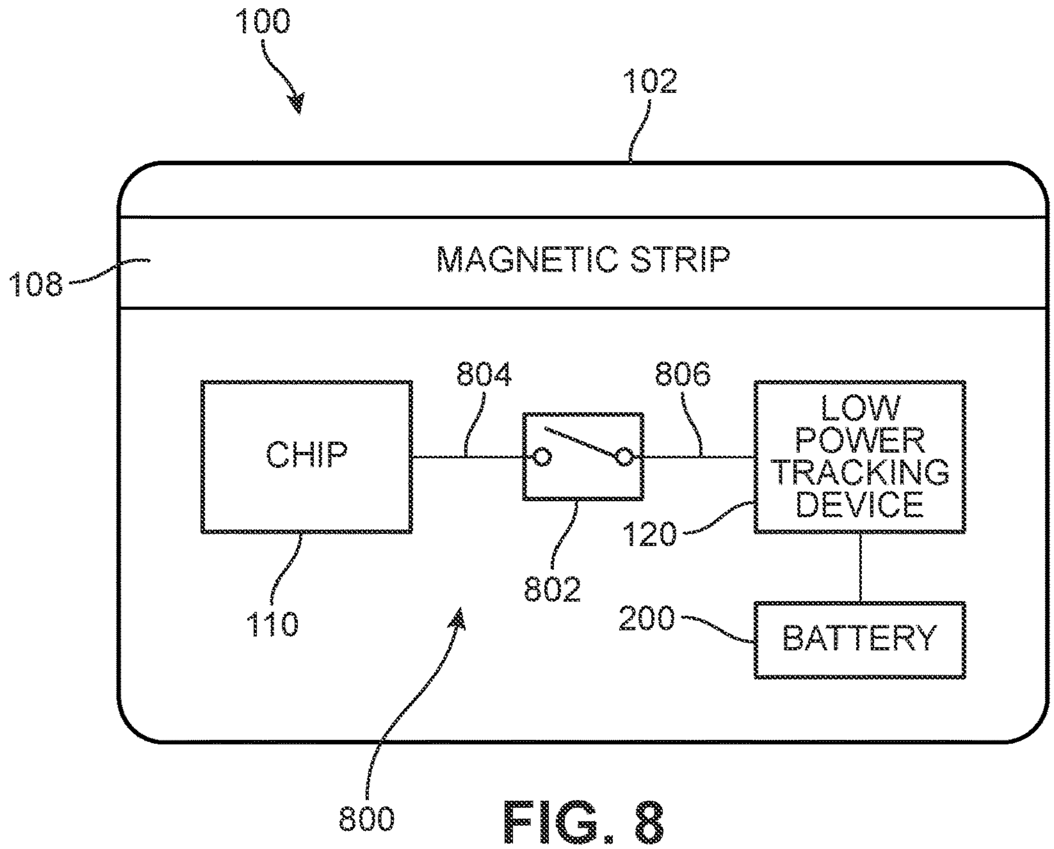
FIG. 8 is an example embodiment of a card with an embedded location tracking device having a tamper mechanism.

In some embodiments, card 100 may include a tamper mechanism configured to defeat attempts to deactivate, destroy, or remove location tracking device 120 from card 100. Referring now to FIG. 8, an example embodiment of card 100 with embedded location tracking device 120 is shown with a tamper mechanism 800. In this embodiment, tamper mechanism 800 includes a switch 802 interposed between location tracking device 120 and chip 110. In one embodiment, switch 802 may be an electromechanical switch movable between a first state (e.g., closed) and a second state (e.g., open). In other embodiments, switch 802 may be an electronic switch that is digitally controlled between the first state (e.g., closed) and the second state (e.g., open).

Tamper mechanism 800 includes a circuit 804 between chip 110 and switch 802 and a circuit 806 between location tracking device 120 and switch 802. When switch 802 is in the first state (e.g., closed), chip 110 is electrically connected to location tracking device 120 via circuit 804 and circuit 806. When switch 802 is in the second state (e.g., open), chip 110 is not connected to location tracking device 120 via circuit 804 and circuit 806. In this embodiment, switch 802 is provided with electricity from battery 200 via circuit 806 that keeps switch 802 in the first state (e.g., closed) as long as its connection with location tracking device 120 and battery 200 is maintained through circuit 806. If a person attempts to disable, destroy, or remove location tracking device 120, the electrical connection between switch 802 and location tracking device 120 and/or battery 200 will become disrupted or disconnected, thereby causing switch 802 to transition from the first state (e.g., closed) to the second state (e.g., open).

In an example embodiment, card 100 and/or chip 110 may include logic that causes chip 110 to be disabled or deactivated when it is not electrically connected to location tracking device 120. Accordingly, when switch 802 is in the second state (e.g., open), for example, after an attempt to disable, destroy, or remove location tracking device 120, chip 110 automatically becomes disabled or deactivated to render card 100 nonfunctional. With this arrangement, tamper mechanism 800 for card 100 having location tracking device 120 prevents or defeats attempts to deactivate, destroy, or remove location tracking device 120 from card 100.

Figure 9:
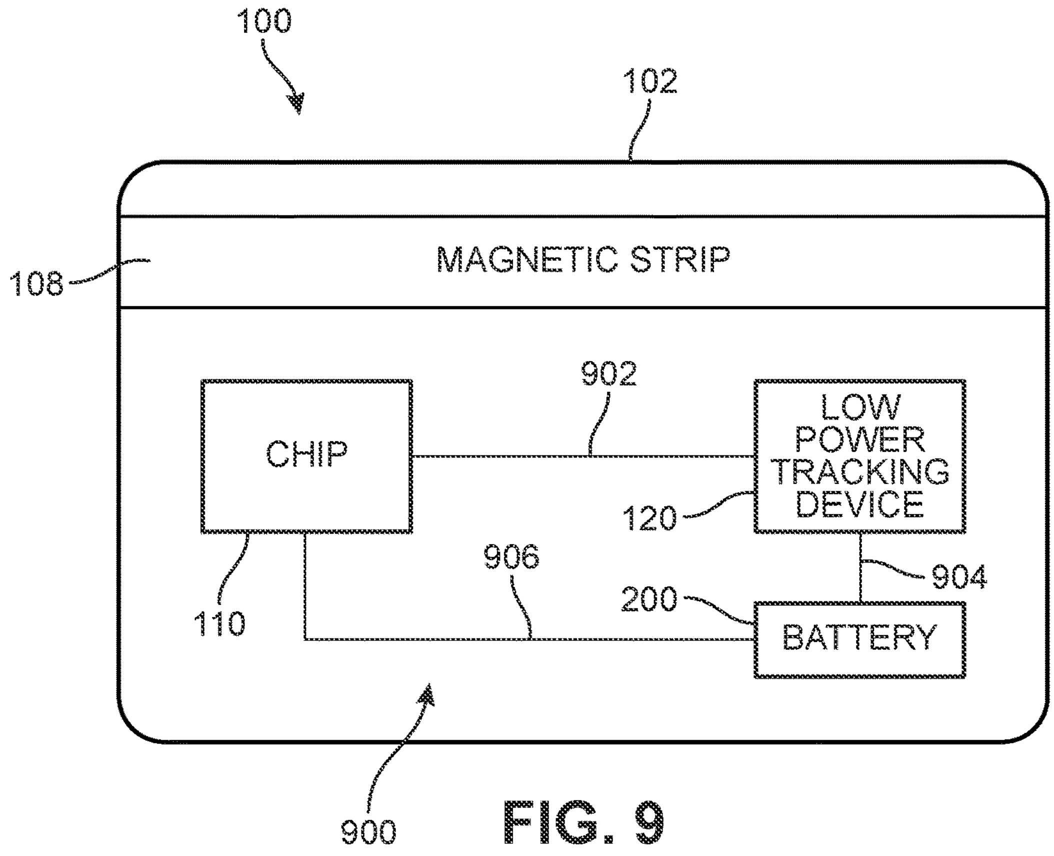
FIG. 9 is an alternate embodiment of a card with an embedded location tracking device having a tamper mechanism.

FIG. 9 is an alternate embodiment of card 100 with embedded location tracking device 120 having a tamper mechanism 900. In this embodiment, tamper mechanism 900 is another embodiment of a tamper mechanism that is configured to defeat attempts to deactivate, destroy, or remove location tracking device 120 from card 100. Tamper mechanism 900 is configured as a closed circuit connecting each of chip 110, location tracking device 120, and battery 200. As shown in FIG. 9, the closed circuit of tamper mechanism 900 connects chip 110 to location tracking device 120 via a first connector 902, location tracking device 120 is connected to battery 200 via a second connector 904, and battery 200 is connected to chip via a third connector 906. In some embodiments, first connector 902, second connector 904, and third connector 906 may be wires. In other embodiments, first connector 902, second connector 904, and third connector 906 may be deposited or printed, for example, as part of a printed circuit board (PCB).

In this embodiment, tamper mechanism 900 connects chip 110, location tracking device 120, and battery 200 in series so that a break in a connection anywhere within the closed circuit causes the entire circuit to be broken. In an example embodiment, card 100 and/or chip 110 may include logic that causes chip 110 to be disabled or deactivated when the closed circuit is broken. Accordingly, when any of first connector 902, second connector 904, and/or third connector 906 is no longer connected to its respective components, for example, after an attempt to disable, destroy, or remove location tracking device 120, chip 110 automatically becomes disabled or deactivated to render card 100 non-functional. With this arrangement, tamper mechanism 900 for card 100 having location tracking device 120 prevents or defeats attempts to deactivate, destroy, or remove location tracking device 120 from card 100.

The components of the tamper mechanisms 800, 900 described herein, including the sensors, circuitry, power source or battery, and circuits connecting the power source or battery to the components may be applied by using printing, by using electrochemistry, by using silk screening or by any other technology for depositing a thin electrically conductive layer or conductor on a magnetic stripe and/or chip card.

Also, the location of the sensors, circuitry, power source or battery, and other components shown in the schematic diagrams are merely exemplary, and numerous different configurations and layouts of these components within a magnetic stripe and/or chip card may be used. Furthermore, the circuits and/or sensors shown above in FIG. 2, FIG. 8, and FIG. 9 are also exemplary and the functions and operations performed by those circuits and/or sensors may be performed by many other electronic circuits and/or sensors.

Figure 10A:
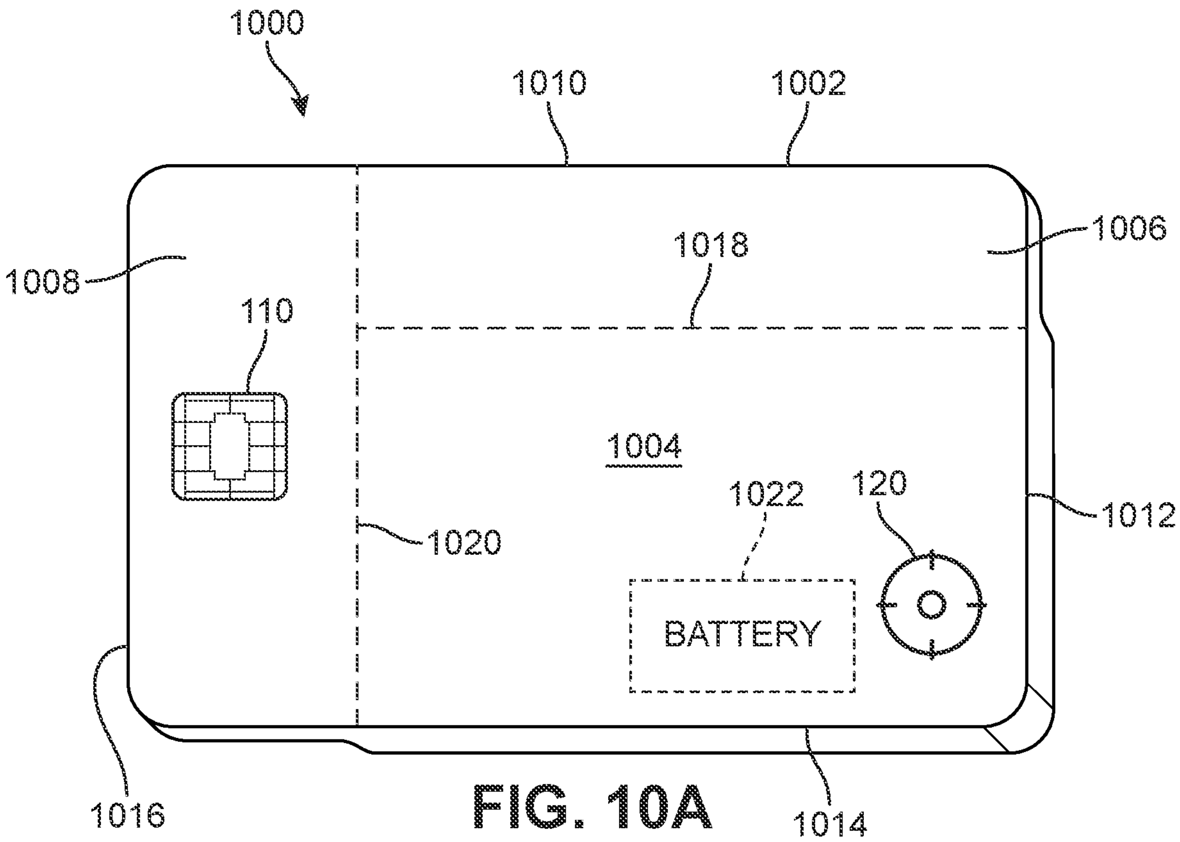
FIGS. 10A-10C are views of an alternate embodiment of a card with an embedded location tracking device having an enlarged battery area.
Figure 10B:
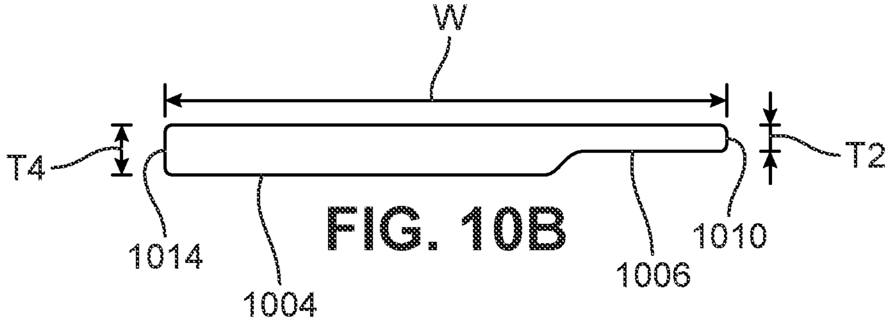
Figure 10C:
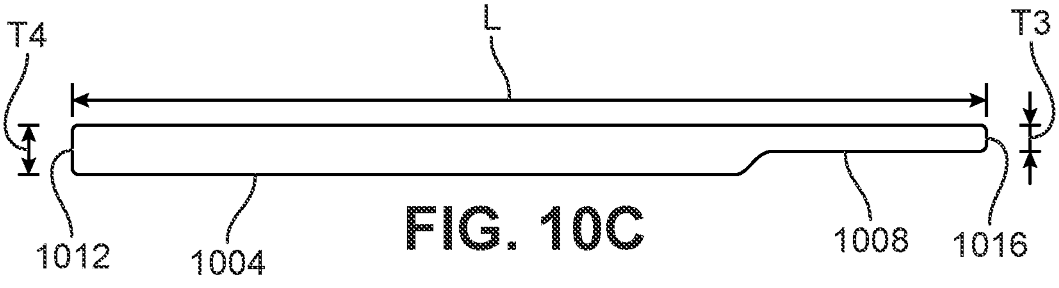

In the example embodiments shown in FIGS. 1-9, card 100 may have the dimensions of a conventional credit or debit card. In other embodiments, a card with an embedded location tracking device may have portions or areas that are larger than a conventional credit or debit card. Referring now to FIGS. 10A-10C, an alternate embodiment of a card 1000 with an embedded location tracking device 120 having an enlarged battery area is shown. In an example embodiment, card 100 includes chip 110 and location tracking device 120, as described above. In contrast to card 100, card 1000 includes an area that is thicker to accommodate a larger battery to power location tracking device 120.

FIG. 10A illustrates a view of a front side of card 1000 with location tracking device 120 embedded within a body 1002 of card 1000. In this embodiment, card 1000 may comprise distinct areas, including a main body area 1004, a magnetic strip area 1006, and a chip area 1008. For purposes of understanding the different areas of card 1000, reference is made to the outer edges of card 1000, including a first (or top) edge 1010, a second (or right) edge 1012, a third (or bottom) edge 1014, and a fourth (or left) edge 1016. Additionally, reference is made to a first inner boundary 1018 and a second inner boundary 1020. These inner boundaries correspond to areas of card 1000 where the thickness of card 1000 may change or transition.

In this embodiment, magnetic strip area 1006 extends from first edge 1010 at the top of card 1000 inwards to first inner boundary 1018. Magnetic strip area 1006 also extends from second edge 1012 on the right side of card 1000 to the opposing fourth edge 1016 on the left side of card 1000. In embodiments where card 1000 includes a magnetic strip, magnetic strip region 108 is located within magnetic strip area 1006 (e.g., on the opposite back side of card 1000) and has the thickness required to allow magnetic strip region 108 to slide through a magnetic strip reader at a merchant terminal.

In this embodiment, chip area 1008 extends from fourth edge 1016 on the left side of card 1000 inwards to second inner boundary 1020. Chip area 1008 also extends from first edge 1010 at the top of card 1000 to the opposing third edge 1014 along the bottom of card 1000. In embodiments where card 1000 includes a chip, chip 110 is located within chip area 1008 of card 1000 and has the thickness required to insert chip area 1008 into a chip reader at a merchant terminal so that chip 110 may read. As seen in FIG. 10A, in some embodiments, there may be an overlap of magnetic strip area 1006 and chip area 1008 in a corner of card 1000, adjacent to where first edge 1002 and fourth edge 1016 meet (e.g., the top left corner as shown in FIG. 10A).

In some embodiments, main body area 1004 comprises a region of card 1000 that extends between third edge 1014 at the bottom of card 1000 and first inner boundary 1018 along a width of card 1000 and between second edge 1012 on the right side of card 1000 and second inner boundary 1020 along a part of a length of card 1000. Main body area 1004 includes location tracking device 120 embedded within body 1002 of card 1000 (e.g., within the material forming body 1002 of card 1000, as described above with reference to card 100). Main body area 1004 also includes a power source, such as a battery, that may also be embedded within body 1002 of card 1000.

In this embodiment, card 1000 includes a battery 1022 (shown in phantom) which provides power to operate location tracking device 120. In an example embodiment, battery 1022 may have a larger size than battery 200 described above. In one embodiment, battery 1022 may be a thin-film battery. For example, battery 1022 may be a non-rechargeable or a rechargeable lithium polymer battery. In some embodiments, battery 1022 may be 1 mm to 2.0 mm thick and 60-80 mm×60-80 mm square, or be rectangular with an area of 1600 mm square to 4,000 mm square, for example, or could be any other shape or size that provides power effective to accomplish the location tracking function of location tracking device 120. Thus battery 1022 embedded in body 1002 of card 1000 can power location tracking device 120. Additionally, because card 1000 has main body area 1004 that is thicker than body 102 of card 100, card 1000 may accommodate battery 1022 that is larger than battery 200 to provide power to location tracking device 120 for a longer period of time. With this arrangement, card 1000 may not require replacement and/or recharging of location tracking device 120 and/or card 1000 as often as card 100. In other embodiments, the components in card 1000 may be powered by an RFID power supply circuit. Card 1000 may optionally include other components than those shown in FIG. 10A.

In the embodiment of FIG. 10A, the length and width of card 1000 generally matches the length and width of a conventional credit or debit card. In some embodiments, card 1000 may have different thicknesses associated with different areas of card 1000. In the embodiment shown in FIG. 10A, the three areas of card 1000 may have different thicknesses. Specifically, the thickness of both magnetic strip area 1006 and chip area 1008 may be substantially less than the thickness of main body area 1004.

As noted above, in some embodiments, magnetic strip area 1006 has a thickness that is selected so that magnetic strip area 1006 can slide into a conventional magnetic strip reader. Likewise, as also noted above, chip area 1008 has a thickness that is selected so that chip area 1008 can slide into a conventional chip reader. In some embodiments, the thicknesses of magnetic strip area 1006 and chip area 1008 may match the thickness of a conventional credit or debit card. In contrast, the thickness of main body area 1004 may be selected to physically accommodate all of the various components, such as location tracking device 120 and battery 1022, as well as other components, such as a tamper mechanism (e.g., tamper mechanism 800, 900 described above).

FIG. 10B is an exemplary illustration of a side view of card 1000 of FIG. 10A with second edge 1012 on the right of card 1000 facing outwards towards the viewer. In this embodiment, magnetic strip area 1006 has a thickness T2 that is substantially less that a thickness T4 of main body area 1004. Thus, in this embodiment, main body area 1004 has thickness T4 that is substantially greater than thickness T2 of magnetic strip area 1006. In this embodiment, thickness T2 substantially matches the thickness of a conventional credit or debit card. For example, in one embodiment, thickness T2 may be within approximately 10% of the thickness of a conventional credit or debit card. As described above, a conventional credit or debit card may have an approximate thickness of 0.75 mm. FIG. 10B also identifies a width W of card 1000.

FIG. 10C is an exemplary illustration of a side view of card 1000 of FIG. 10A with first edge 1002 on the top of card 1000 facing towards the viewer. In this embodiment a thickness T3 of chip area 1008 may be less than thickness T4 of main body area 1004. Thus, in this embodiment, main body area 1004 has thickness T4 that is substantially greater than thickness T3 of chip area 1008. In some embodiments, thickness T3 of chip area 1008 substantially matches the thickness of a conventional credit or debit card. For example, in one embodiment, thickness T3 may be within approximately 10% of the thickness of a conventional credit or debit card. FIG. 10C also identifies a length L of card 1000.

Figure 11A:
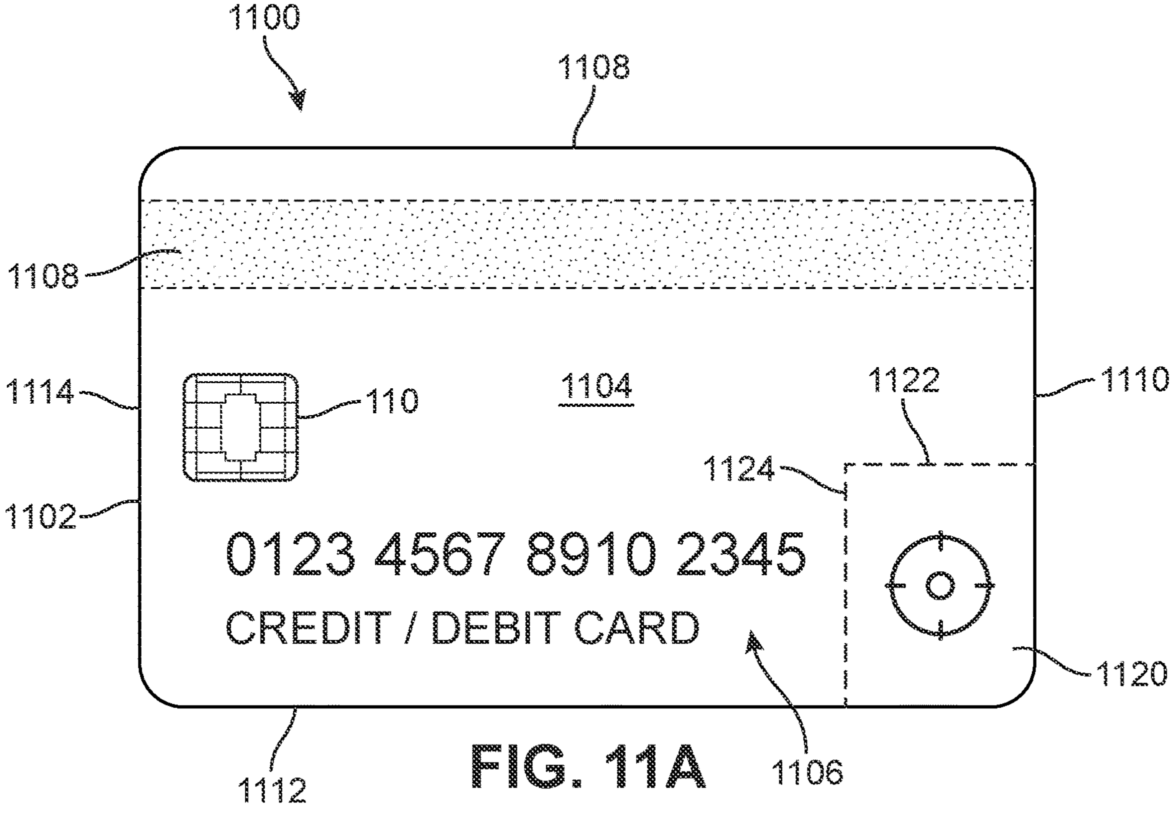
FIGS. 11A-11B are views of an alternate embodiment of a card with an embedded location tracking device having a removable portion.
Figure 11B:
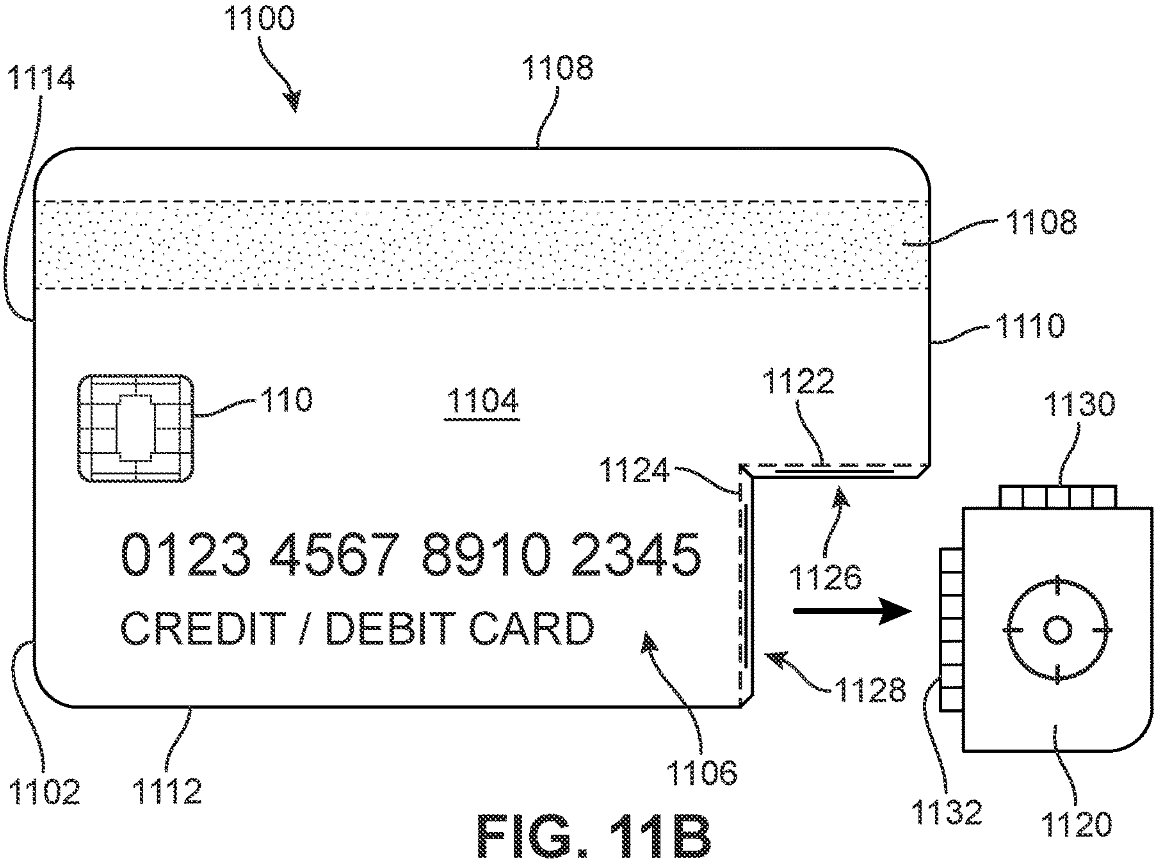

FIGS. 11A-11B are views of an alternate embodiment of a card 1100 with an embedded location tracking device 1102 having a removable portion. In this embodiment, card 1100 has a body 1102 having a generally rectangular shape. In an example embodiment, card 1100 has a front side 1104 on which card information 1106 may be provided. Card information 1106 may include, but is not limited to: a credit card number, expiration date, card holder name, issuing bank name, security codes, etc. In some cases, portions of card information 1106 may be additionally or alternatively located on the back side of card 1100 (e.g., opposite from front side 1104).

In an example embodiment, card 1100 includes magnetic strip region 108 and/or chip 110, as described above. In this embodiment, magnetic strip region 108 is located on the back side of card 1100 (e.g., opposite from front side 1104). In other embodiments, magnetic strip region 108 may be located on front side 1104 of card 1100. For purposes of understanding the different areas of card 1100, reference is made to the outer edges of card 1100, including a first (or top) edge 1108, a second (or right) edge 1110, a third (or bottom) edge 1112, and a fourth (or left) edge 1114.

In some embodiments, card 1100 includes a removable location tracking device 1120. Removeable location tracking device 1120 may be substantially similar to location tracking device 120. In contrast to location tracking device 120, however, removable location tracking device 1120 is configured to be removed from card 1100. For example, removable location tracking device 1120 may be removed from card 1100 along a first connection line 1122 and a second connection line 1124. In this embodiment, removable location tracking device 1120 is located at the bottom right corner of card 1110 (e.g., at the intersection of second edge 1110 and third edge 1112). First connection line 1122 and second connection line 1124 releasably connect the corner of card 1100 including removable location tracking device 1120 with the remaining portion of card 1100 so that removable location tracking device 1120 may be separated from body 1102 of card 1100.

Referring now to FIG. 11B, the portion of card 1100 including removable location tracking device 1120 is shown separated from the remaining portion of body 1102 of card 1100. In this embodiment, removable location tracking device 1120 separates from body 1102 of card 1100 at first connection line 1122 and second connection line 1124. In some embodiments, body 1102 of card 1100 may include recesses or receiving members disposed within body 1102 that are configured to mate with corresponding connecting members on removable location tracking device 1120 to removably attach removable location tracking device 1120 to card 1100.

In this embodiment, body 1102 of card 1100 includes a first receiving member 1126 at first connection line 1122 and a second receiving member 1128 at second connection line 1124. Removable location tracking device 1120 includes a first connecting member 1130 that is configured to mate with first receiving member 1126 at first connection line 1122 and a second connecting member 1132 that is configured to mate with second receiving member 1128 at second connection line 1124. First connecting member 1130 and second connecting member 1132 may be configured to extend into body 1102 of card 1100 within first receiving member 1126 and second receiving member 1128, respectively, to connect and/or detach removable location tracking device 1120 with body 1102 of card 1100. With this arrangement, removable location tracking device 1120 may be removably attached to body 1102 of card 1100.

Additionally, in some embodiments, first connecting member 1130 and second connecting member 1132 may also couple and/or uncouple a power source, such as a battery (e.g., battery 200 or battery 1022), with other components of card 1100 that are located within body 1102 of card 1100. For example, in some cases, card 1100 may include a tamper mechanism, such as tamper mechanism 800, 900, described above, that may be electrically connected to the battery in removable location tracking device 1120 via first connecting member 1130 and second connecting member 1132. With this arrangement, removable location tracking device 1120 may be charged separately from card 1110 or may be replaced with a different removable location tracking device. Additionally, by providing card 1110 with removable location tracking device 1120 and a tamper mechanism (e.g., tamper mechanism 800, 900), card 1100 may be intentionally temporarily disabled or deactivated by removing removable location tracking device 1120 from card 1100.

Figure 12:
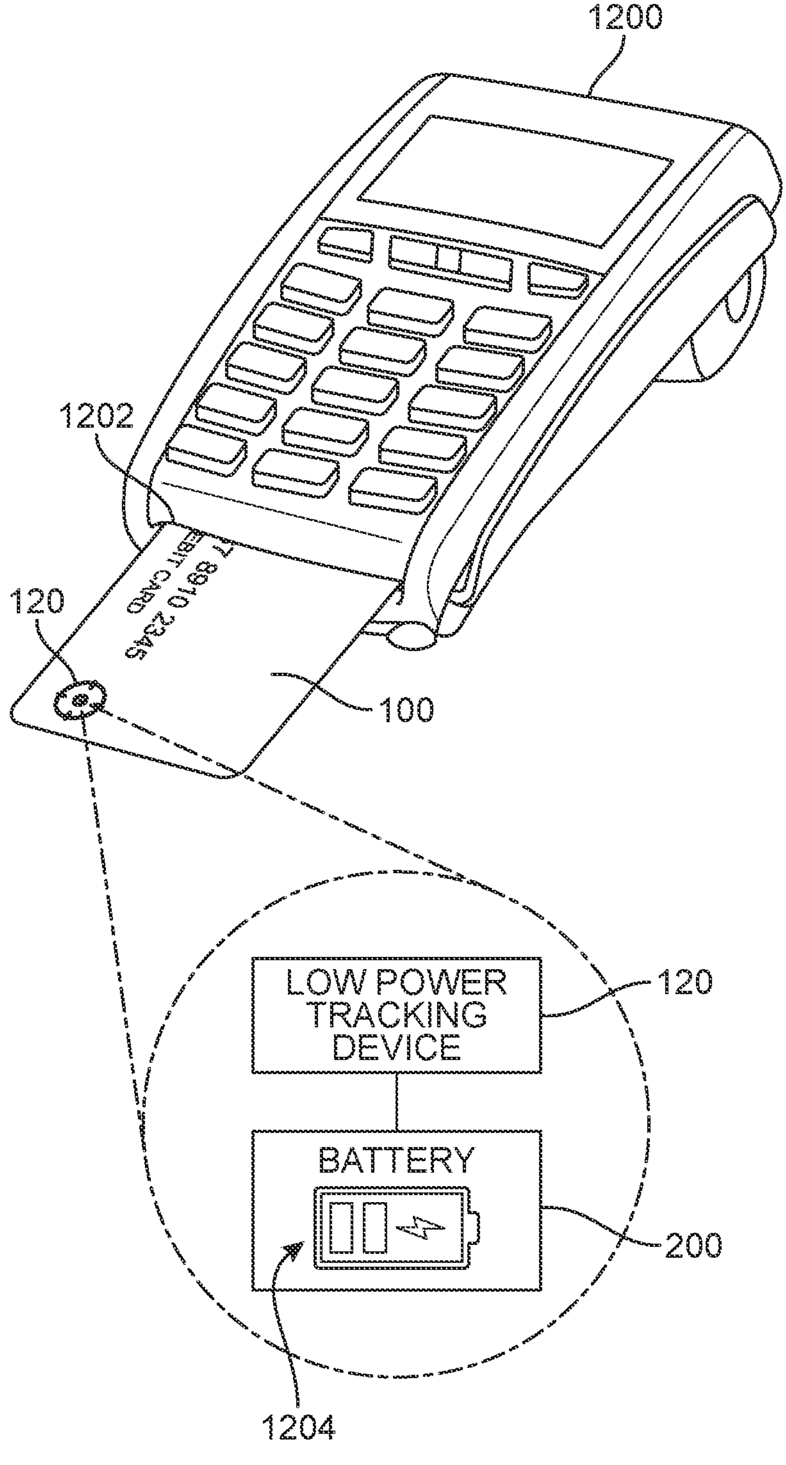
FIG. 12 is a representative view of an example embodiment of a process for charging a battery of a card with an embedded location tracking device using a point-of-sale terminal.

In some embodiments, the battery powering the location tracking device (e.g., battery 200 powering location tracking device 120 of card 100) may be a rechargeable battery that is configured to draw power for charging from various devices interacting with card 100. Referring now to FIG. 12, a representative view of an example embodiment of a process for charging battery 200 of card 100 with embedded location tracking device 120 using a point-of-sale terminal 1200 is shown. In this embodiment, point-of-sale terminal 1200 may be used by a card holder to make a purchase using card 100 by inserting the portion of card 100 including chip 110 and/or magnetic strip 108 into a slot 1202 of terminal 1200.

When card 100 including location tracking device 120 is inserted within slot 1202 of terminal 1200, battery 1200 of location tracking device 120 may be charged. For example, as shown in FIG. 12, battery 200 is shown being charged 1204 while card 100 is disposed within slot 1202 of terminal 1200. In some cases, battery 200 may be charged via induction charging from terminal 1200. In other cases, battery 200 may be charged via a coil or a passive RFID tag that is energized by the movement of card 100 within terminal 1200. While terminal 1200 shown in FIG. 12 is a point-of-sale terminal that includes a chip reader, other types of terminals, including but not limited to different types of point-of-sale or payment terminals and ATMs that include magnetic strip readers, chip readers, or both, may be used in a similar manner to charge battery 200 of location tracking device 120 embedded in card 100.

Figure 13:
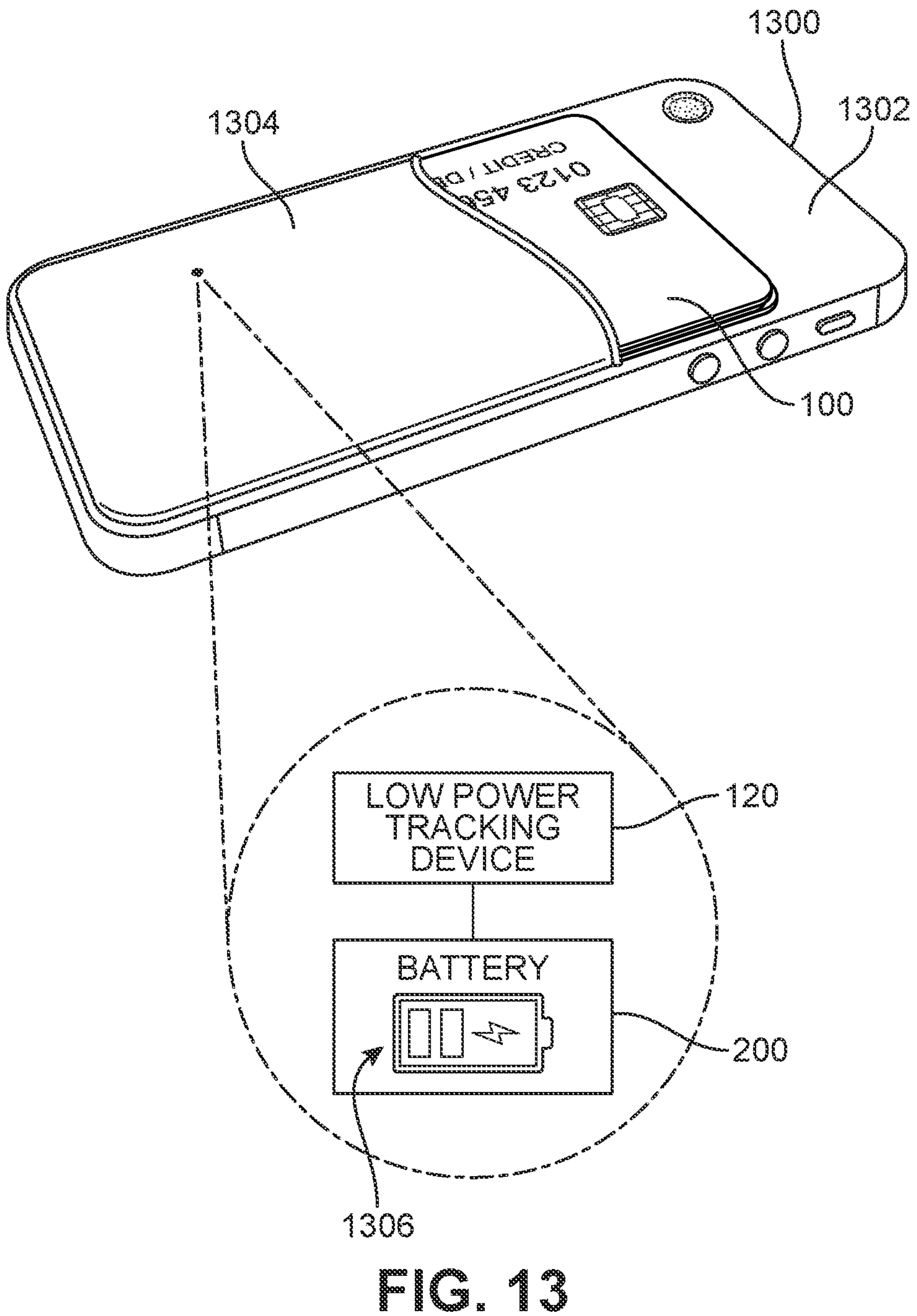
FIG. 13 is a representative view of an example embodiment of a process for charging a battery of a card with an embedded location tracking device using a user device.

FIG. 13 is a representative view of an example embodiment of a process for charging battery 200 of card 100 with embedded location tracking device 120 using a user device 1300 is shown. In some embodiments, user device 1300 may be a smart phone, tablet, or other mobile device, that includes an internal battery with induction charging capabilities. In this embodiment, card 100 with embedded location tracking device 120 may be inductively charged by the internal battery of user device 1300 while card 100 is in contact or close proximity to a back side 1302 of user device 1300. For example, as shown in FIG. 13, card 100 with embedded location tracking device 120 is placed in a card wallet 1304 that is attached to back side 1302 of user device 1300. The location of card wallet 1304 on back side 1302 of user device 1300 corresponds to the location of the internal battery within user device 1300 so that card 100 is properly aligned with the internal battery for inductive charging 1306 of battery 200 of location tracking device 120 when card 100 is placed in card wallet 1304.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A card comprising:

a body;

at least one of a chip or a magnetic strip portion disposed in the body; and a removable location tracking device removably attached to the body;

wherein the removable location tracking device is attached to the body along a first connection line and a second connection line that releasably connect the removable location tracking device to the card so that the removable location tracking device may be separated from the body of the card.

2. The card according to claim 1, further comprising a battery embedded within the body, the battery electrically connected to at least the removable location tracking device.

3. The card according to claim 2, wherein the battery is charged using induction charging while the card is disposed within a slot of a payment terminal or an automatic teller machine.

4. The card according to claim 2, wherein the battery is charged using induction charging while the card is in contact or close proximity with an internal battery of a user device.

5. The card according to claim 1, wherein the removable location tracking device communicates using a short-range wireless communication technology.

6. The card according to claim 5, wherein the removable location tracking device communicates using two different short-range wireless communication technologies.

7. The card according to claim 6, wherein the two different wireless communication technologies include a first wireless communication technology having a first accuracy range and a second wireless communication technology having a second accuracy range, wherein the second accuracy range provides a location accurate to a smaller distance than the first accuracy range.

8. The card according to claim 1, further comprising a tamper mechanism that disables or deactivates the card in response to an attempt to deactivate, destroy, or remove the removable location tracking device from the card.

9. The card according to claim 8, the card including the chip;

wherein the tamper mechanism includes a switch interposed between the removable location tracking device and the chip;

wherein the switch has a first state where the switch is closed and a second state where the switch is open;

wherein the switch remains in the first state as long as the removable location tracking device is connected to the switch, and, wherein, in the second state, the chip is disabled.

10. The card according to claim 8, the card including the chip;

wherein the tamper mechanism is a closed circuit formed between the chip, the removable location tracking device, and a battery; and wherein when the closed circuit is interrupted, the chip is disabled.

11. The card according to claim 1, wherein the card has a generally rectangular shape defined by a first edge, a second edge, a third edge, and a fourth edge; and wherein the removable location tracking device is located at a corner of the card where the second edge intersects the third edge.

12. The card according to claim 1, wherein the body of the card includes receiving members disposed within the body that are configured to mate with corresponding connecting members on the removable location tracking device.

13. The card according to claim 12, wherein the connecting members mate with the receiving members along the first connection line and the second connection line.

14. The card according to claim 12, wherein the connecting members extend into the body of the card when the removable location tracking device is attached.

15. The card according to claim 12, wherein the connecting members are configured to couple at least the removable location tracking device to a battery of the card.

16. A method of disabling a card, comprising:

providing a card having a body, a chip disposed in the body, a removable location tracking device removably attached to the body along a first connection line and a second connection line that releasably connect the removable location tracking device to the card so that the removable location tracking device may be separated from the body of the card, and a tamper mechanism that disables or deactivates the card in response to an attempt to deactivate, destroy, or remove the removable location tracking device from the card;

wherein the tamper mechanism includes a switch interposed between the removable location tracking device and the chip, the switch has a first state where the switch is closed and a second state where the switch is open; and separating the removable location tracking device from the body of the card to place the switch in the second state and disable the chip.

17. The method according to claim 16, further comprising:

re-attaching the removable location tracking device to the body of the card to place the switch in the first state and render the chip functional.

18. The method according to claim 16, wherein the body of the card includes receiving members disposed within the body that are configured to mate with corresponding connecting members on the removable location tracking device.

19. The method according to claim 18, further comprising:

coupling at least the removable location tracking device to a battery of the card when the connecting members are mated with the receiving members.

20. The method according to claim 16, wherein the card has a generally rectangular shape defined by a first edge, a second edge, a third edge, and a fourth edge; and wherein the removable location tracking device is located at a corner of the card where the second edge intersects the third edge.

* * * * *